(12) United States Patent
Cho

(10) Patent No.: US 9,841,929 B1
(45) Date of Patent: Dec. 12, 2017

(54) DISTRIBUTED SYSTEM SOFTWARE INFRASTRUCTURE

(71) Applicant: Won T. Cho, San Mateo, CA (US)

(72) Inventor: Won T. Cho, San Mateo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 502 days.

(21) Appl. No.: 13/631,246

(22) Filed: Sep. 28, 2012

(51) Int. Cl.
| | |
|---|---|
| *G06F 3/06* | (2006.01) |
| *G06F 11/07* | (2006.01) |
| *G06F 9/445* | (2006.01) |
| *G06F 9/38* | (2006.01) |
| *G06F 11/30* | (2006.01) |

(52) U.S. Cl.
CPC .......... *G06F 3/0685* (2013.01); *G06F 3/0665* (2013.01); *G06F 9/3891* (2013.01); *G06F 9/44505* (2013.01); *G06F 11/0709* (2013.01); *G06F 11/3006* (2013.01)

(58) Field of Classification Search
CPC ...................................................... G06Q 30/02
See application file for complete search history.

(56) References Cited

U.S. PATENT DOCUMENTS

| | | | | |
|---|---|---|---|---|
| 7,194,538 B1* | 3/2007 | Rabe | ..................... | G06F 3/0605 709/220 |
| 7,685,602 B1* | 3/2010 | Tran et al. | ................... | 719/311 |
| 8,335,851 B1* | 12/2012 | Vendrow | ........................ | 709/226 |
| 8,510,755 B2* | 8/2013 | Paramasivam et al. | ...... | 719/317 |
| 2011/0145367 A1* | 6/2011 | Ananthanarayanan | | H04L 67/2842 709/219 |
| 2012/0259912 A1* | 10/2012 | Kruse | ................. | G06F 17/3012 709/203 |
| 2013/0250960 A1* | 9/2013 | Hickman et al. | ............. | 370/398 |
| 2014/0006581 A1* | 1/2014 | Raghu | ........................... | 709/223 |

OTHER PUBLICATIONS

Ordille, J.J.; Miller, B.P., "Distributed active catalogs and meta-data caching in descriptive name services," Distributed Computing Systems, 1993., Proceedings the 13th International Conference on , vol., no., pp. 120,129, May 25-28, 1993.*

* cited by examiner

*Primary Examiner* — Eric S Cardwell
(74) *Attorney, Agent, or Firm* — Konrad R. Lee; Krishnendu Gupta

(57) ABSTRACT

A computer-executable method, system, and computer program product for providing data services, using a single control path, on a data storage resource selected from a plurality of heterogeneous storage resources, the computer-executable method comprising receiving a request for managing the data storage resource, analyzing the request to determine if a service for managing the data storage resource is available for satisfying the request, and based on the analyzing, providing access to the service for managing the data storage resource from the heterogeneous storage resources.

27 Claims, 12 Drawing Sheets

DISTRIBUTED SYSTEM SOFTWARE INFRASTRUCTURE

CROSS REFERENCE TO RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", and Ser. No. 13/631,214 entitled "AUTOMATED POLICY BASED SCHEDULING AND PLACEMENT OF STORAGE RESOURCES" filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for providing data services, using a single control path, on a data storage resource selected from a plurality of heterogeneous storage resources, the computer-executable method comprising receiving a request for managing the data storage resource, analyzing the request to determine if a service for managing the data storage resource is available for satisfying the request, and based on the analyzing, providing access to the service for managing the data storage resource from the heterogeneous storage resources.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
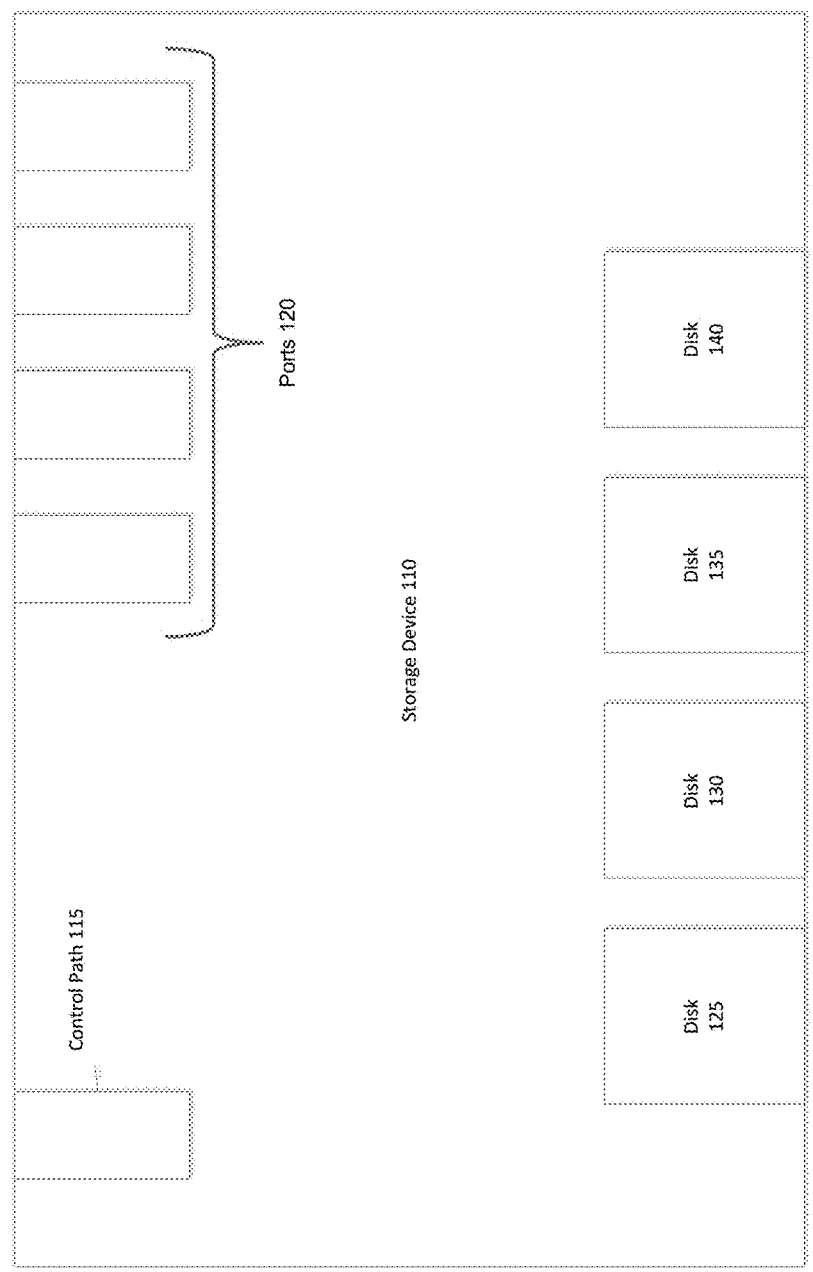
FIG. 1 is a simplified illustration of a data storage device, in accordance with an embodiment of the present disclosure.

Typically, control of and provisioning of multiple data services for heterogeneous storage systems may be problematic. Conventionally, some systems may have only enabled provisioning of homogenous storage systems. Generally, controlling and managing provisioning of heterogeneous storage may not have been possible.

In certain embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as one large storage array. In further embodiments, the current disclosure may enable one big array to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, Data services may provide the high-level data and storage management capabilities of the system.

A service coordinator may be a service for maintaining a cluster-wide configuration and service registry. In many embodiments, a service coordinator may facilitate a software management service in providing the high-level data and storage management capabilities of the system.

A software management service may be a component or system of a One Big Array enabled to monitor, manage, and maintain a One Big Array.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a one big array. In some embodiments, a tenant may be created in a system for the purposes of security isolation.

A project may be a resource organization abstraction that maps resources to applications, virtual data centers, departments, or other entities. In some embodiments, a user may create projects and may associate multiple resources from different data services with the projects. In most embodiments, resources from one project maybe shared between users under the same tenant.

A Class of Service may represent high-level capabilities and services that are created by users through composition of resource attributes and quality of services, including level of protection, availability, access protocol, performance, and additional storage/data services, such as versioning/snap, backup, remote replication, data reduction, encryption, etc.

Generally, a data storage array or system may be one or more physical boxes or a cluster of physical boxes. In conventional systems, the data storage array or system may have one control path and some number of data paths. In typical systems, one or more data path ports may provide data path access to the storage resources contained within the storage system. Typically, the protocols for the data path ports may be fiber channel, Internet Protocol (IP), iSCSI, or NTFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Refer, now to the example embodiment of FIG. 1 which illustrates a sample storage device. Storage device 110 has control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

In certain embodiments, the current disclosure may enable data-centric cloud infrastructures to be managed efficiently and flexibly through the data management software platform. In many embodiments, the current disclosure may enable a data management software platform to manage heterogeneous storage resources. In some embodiments, the data management software platform may operate as an autonomous cluster. In certain embodiments, the data management software platform may be enabled to communicate with other autonomous clusters. In some embodiments, a cluster may reside within a zone having multiple clusters. In many embodiments, the current disclosure may enable the data management software platform to maintain the operational state within an individual cluster by providing management functionality. In some embodiments, the cluster may have a service coordinator to enable a cluster to monitor, maintain, and service the cluster. In many embodiments, the service coordinator may enable communication with other clusters. In certain embodiments, the current disclosure may enable a service coordinator to manage a cluster during a cross-instance network partition. In many embodiments, a service coordinator may enable a cluster to determine its own health and determine the health of other cluster nodes in the same zone. In some embodiments, the service coordinator may enable rolling software upgrades and rolling schema upgrades to avoid cluster downtime.

In many embodiments, the service coordinator may maintain a cluster-wide configuration and service registry. In some embodiments, the service coordinator may act as a catalog of live/active software management services running on a cluster, running the data management software platform. In certain embodiments, services may be a component or system of the data management software platform configured to manage or maintain heterogeneous storage resources. In some embodiments, services may be implemented in software. In other embodiments, services may be implemented on physical or virtual hardware. In certain embodiments, a service coordinator may enable a data management software platform service to bootstrap from the service coordinator and resolve external dependencies at runtime or during initialization. In most embodiments, a service coordinator may reside in a clustered configuration, enabling runtime and configuration states to be replicated across other clusters. In certain embodiments, a service coordinator may function with N number of failures when there are 2N+1 number of total nodes in a cluster.

In some embodiments, a service coordinator may enable the creation of a dynamic directory for managing services running within an instance of the cluster and managing access points to the cluster. In many embodiments, a service coordinator may enable services within clusters to register with a service coordinator and store information (i.e. location, version, etc.) or update information related to the service. In some embodiments, a service coordinator may enable the maintenance of a query engine to enable query searches for services within a cluster by attribute (i.e. name, version, UUID, etc.). In many embodiments, the service coordinator may enable a service to determine its dependencies (i.e. a block store data service may locate its dependencies, such as the Meta Data Service or BIOS Controllers) to accomplish management of the heterogeneous storage resources managed, maintained, and controlled by the cluster.

In certain embodiments, the current disclosure may enable a cluster to maintain consistency during network partition, node failures, or maintain the cluster. In many embodiments, a service coordinator may have a decision engine. In some embodiments, a decision engine may make decisions during events, such as network partitioning, coordinating node failures, or cluster maintenance. In an embodiment, a decision engine may decide which instance of a service may exert control during an event. In certain embodiments, a service coordinator may use heuristic methods (i.e. majority rule, round-robin, etc.) to determine which portions of the cluster may control the entire cluster.

In many embodiments, the current disclosure may enable a service coordinator to manage the health of a cluster by detecting service or coordinator node failures. In some embodiments, a service coordinator may facilitate bi-directional ping activities between services or coordinator clusters to detect both service or coordinator node failures. In many embodiments, a service coordinator may enable a user or administrator to customize timeouts defining when a service or a coordinator node has failed. In some embodiments, a service coordinator may have an auto-drop system where services may be dropped when the timeout has been exceeded. In certain embodiments, when a service has been dropped, requests for the service may be re-routed to other instances of the service.

In many embodiments, a service coordinator may enable the cluster to provide distributed synchronization capabilities for the heterogeneous storage resources. In some embodiments, a service coordinator may use distributed locks to serialize access to a data storage resource from heterogeneous data storage resources across multiple nodes within a cluster or system. In certain instances, a service coordinator may lock one or more data storage resource from heterogeneous storage resources to control access to the storage resources.

In some embodiments, the service coordinator may have a database service. In certain embodiments, the data base service may be responsible for persistence and query function with cluster of one big arrays. In many embodiments, a database service may also be clustered, enabling users/administrators to increase the data base service's capacity and throughput by expanding the size of the cluster. In some embodiments, a database service may maintain persistent data. In certain embodiments, services and components within the one big array may query the data base service for information on demand.

Figure 2:
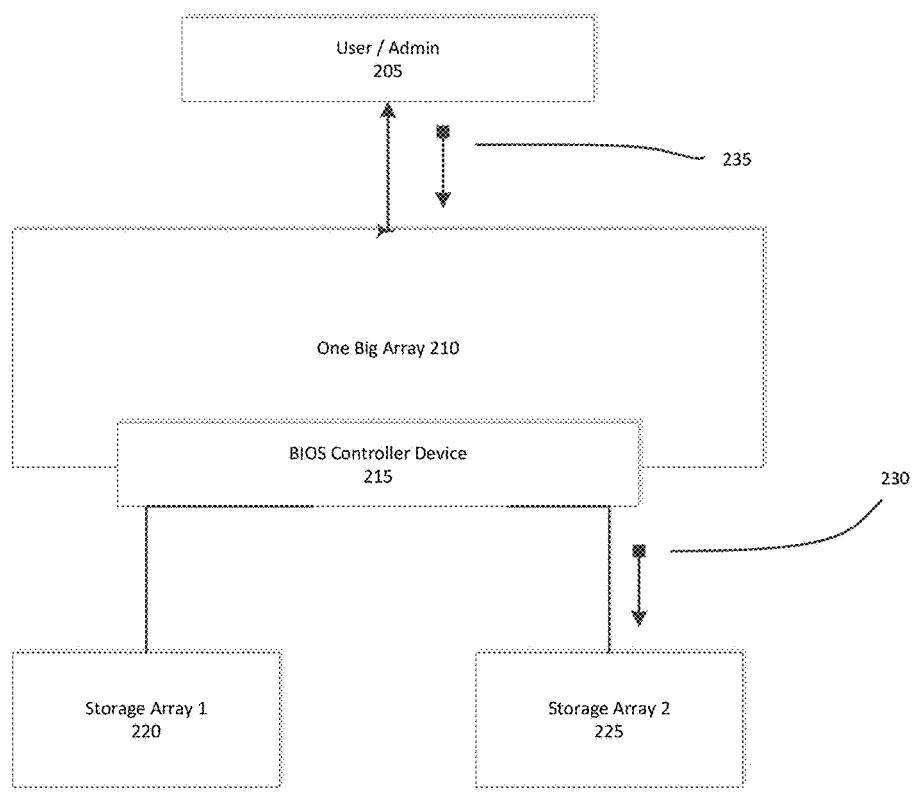
FIG. 2 is a simplified illustration of a one big array with in accordance with an embodiment of the present disclosure.

Refer now to the example embodiment of FIG. 2. FIG. 2 illustrates an example embodiment of a one big array. As shown in FIG. 2, User/Administrator 205 communicates with One Big Array 210 through a single control path. User/Administrator 205 sends provisioning request 235 to One Big Array 210 requesting provisioning of storage arrays 220, 225. As shown, One Big Array 210 processes provisioning request 235 and sends an allocation request 230 to storage array 225 to fulfill provisioning request 235.

Figure 3:
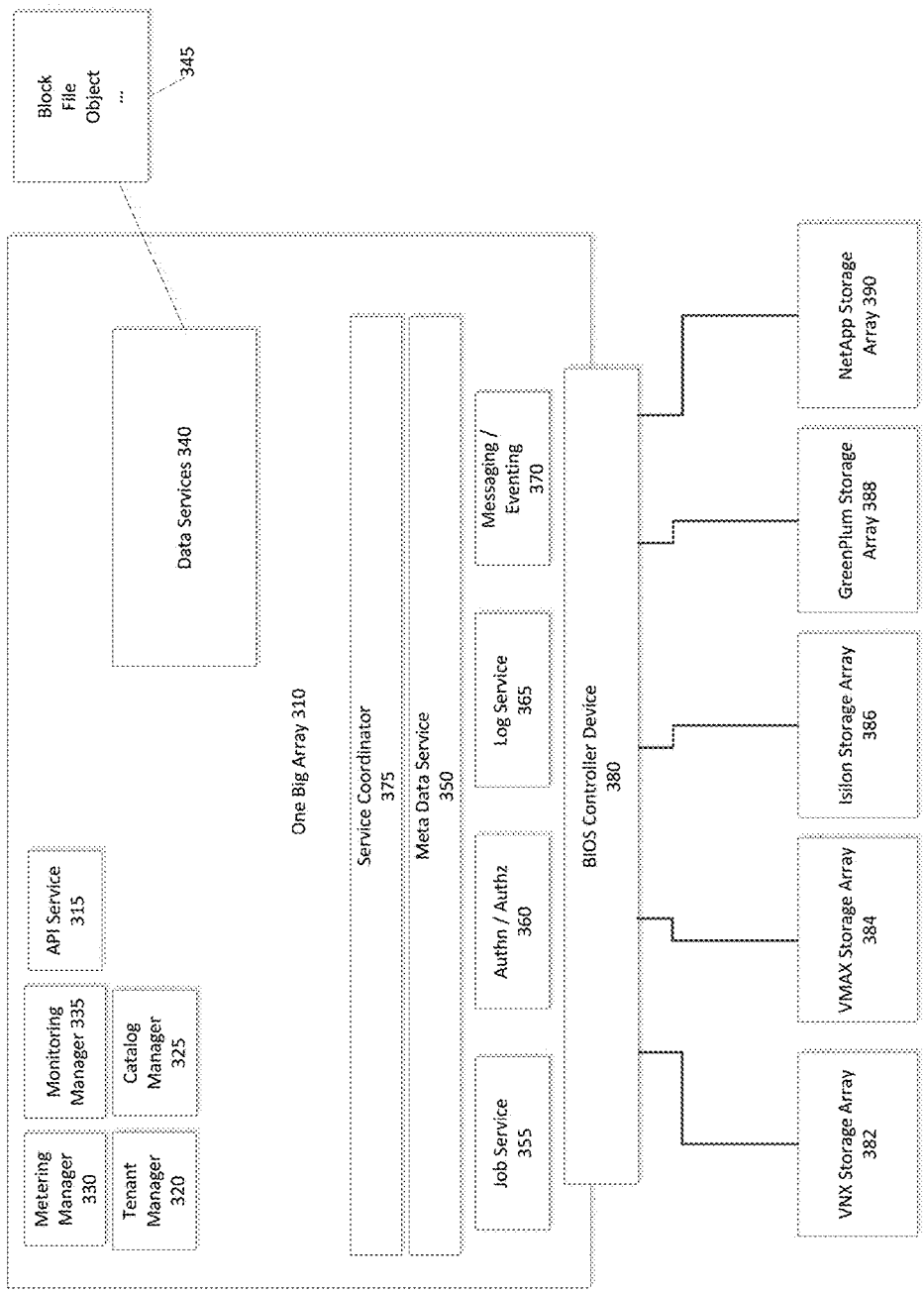
FIG. 3 is a simplified illustration of a distributed infrastructure of a one big array, in accordance with an embodiment of the present disclosure.

Refer now to the example embodiment of FIG. 3. The example embodiment of FIG. 3 illustrates an embodiment of a one big array. API Service 315 enables external access to User/Administrator (FIG. 2, 205). As shown, API Service 315 communicates request to One Big Array 310. API Service 315 accesses to Service Coordinator 375. Service Coordinator 375 enables access to other software management services and management modules. Service Coordinator 375 may provide access to, and manage, tenant manager 320, catalog manager 325, metering manager 330, monitoring manager 335, data services 340, meta data service 350, job service 355, authn/authz 360, log service 365, messaging/eventing 370, and BIOS Controller Device 380. Data Services 340, within One Big Array 310, provides block, file, and object data services 345. Service Coordinator 375 enables One Big Array 310 to consume and offer storage provided by VNX 382, VMAX 384, Isilon 386, GreenPlum 388, and NetApp 390. While specific storage types are mentioned, one with ordinary skill in the art would recognize that other types of storage resources may be used to create the heterogeneous storage resources as shown in FIG. 3.

Figure 4:
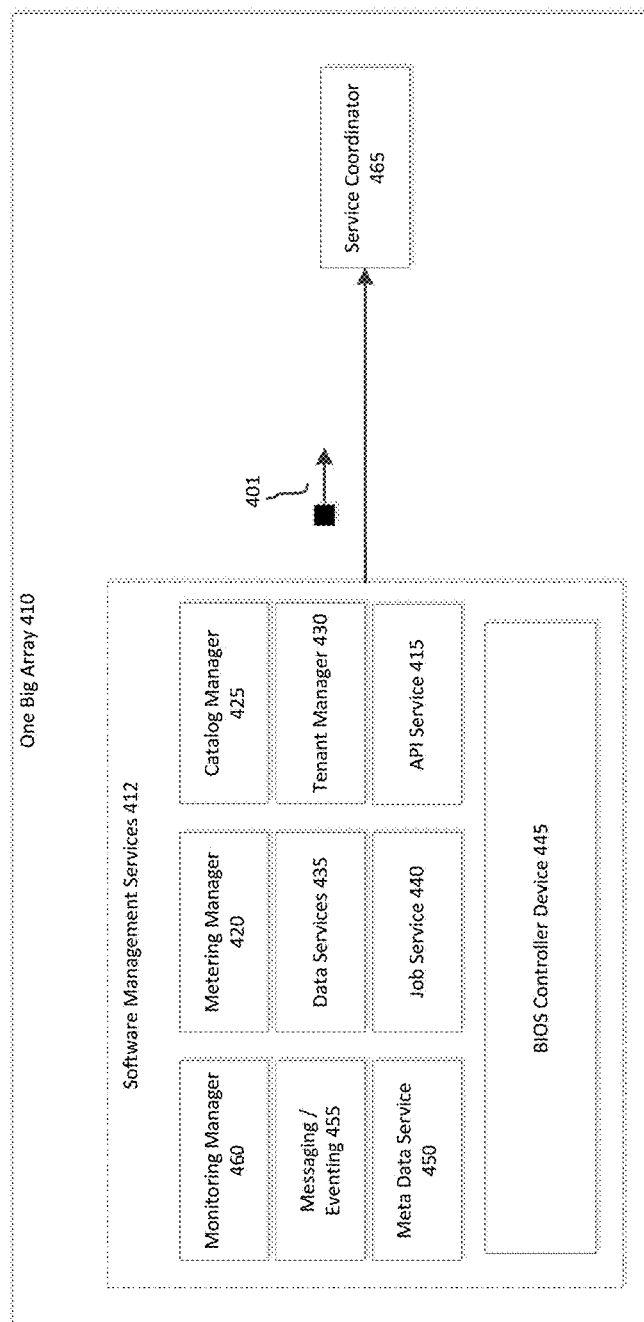
FIG. 4 is a further alternative simplified illustration of a distributed infrastructure of a one big array, in accordance with an embodiment of the present disclosure.

Refer now to the example embodiments of FIG. 4. FIG. 4 illustrates a simplified example of a distributed infrastructure implemented in a one big array, in accordance with an embodiment of the present disclosure. As shown in FIG. 4, One Big Array 410 has software management services 412 having API Service 415, Metering Manager 420, Catalog Manager 425, Tenant Manager 430, Data Services 435, Job Services 440, BIOS Controller Device 445, Meta Data Services 450, Messaging/Eventing 455, Monitoring Manager 460, and Service Coordinator 465. Service Coordinator 465 enables One Big Array 410 to monitor, maintain, and service internal components and systems, while enabling communication with other one big array. As shown in FIG. 4, each software management service 412 sends registration request 401 to the Service Coordinator 465. In many embodiments, registration request 401 may have a service kind (i.e. Class of service/type of service), service endpoint (i.e. location/IP address), service API version, a service unique ID (UUID), or additional metadata.

Figure 5:
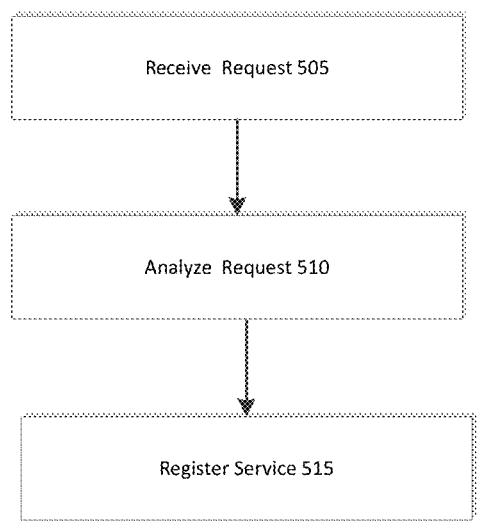
FIG. 5 is an example embodiment of a method of managing a distributed infrastructure of a one big array, in accordance with an embodiment of the present disclosure.

Refer now to the example embodiments of FIGS. 4 and 5. The example embodiments illustrate a simplified flow of how One Big Array 410 manages a distributed infrastructure implemented in One Big Array 410. Service Coordinator 465 receives registration request 401 from each module (Step 505). Service Coordinator 465 analyzes registration request 401 (Step 510). In certain embodiments, analyzing registration request 401 (Step 510) may include determining from which component or system a requested originated. In other embodiments, the analyzing may include determining a status of a component or system being registered. As shown, Service Coordinator 465 registers each software management service 412. (Step 515). In many embodiments, a registered software management service may search for, and gain access to, other registered software management services. In certain embodiments, registration information may have a location, IP address, version information, a unique ID, etc.

Figure 6:
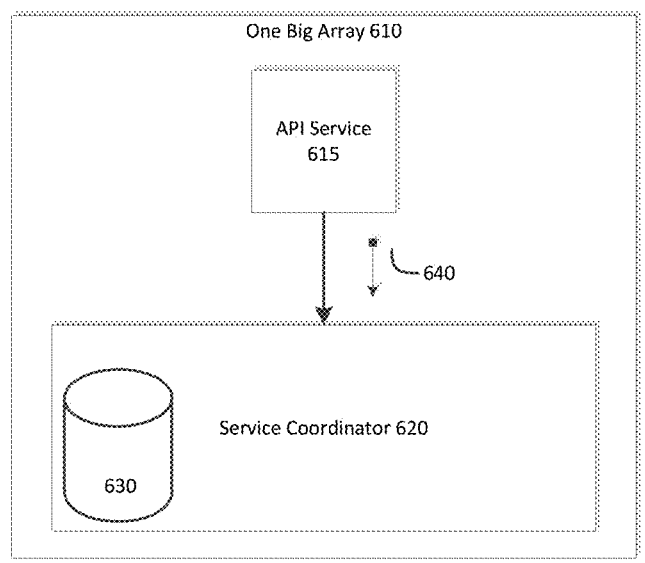
FIG. 6 is a further alternative simplified illustration of a distributed infrastructure of a one big array, in accordance with an embodiment of the present disclosure.
Figure 7:
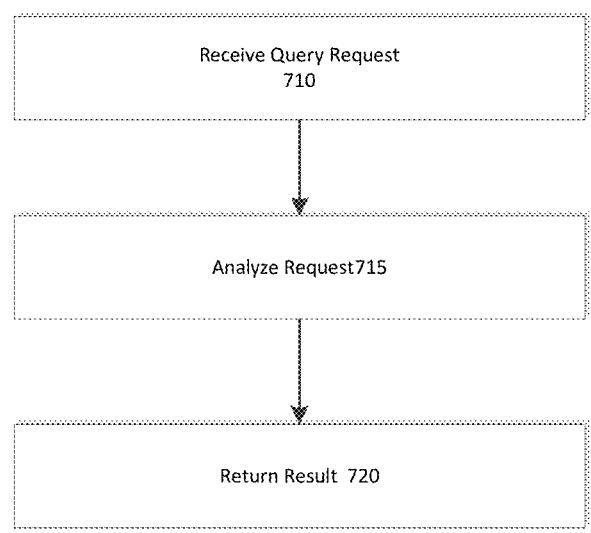
FIG. 7 is an alternative example embodiment of a method of managing a distributed infrastructure of a one big array, in accordance with an embodiment of the present disclosure.

Refer now to the example embodiments of FIGS. 6 and 7. The example embodiments illustrate a simplified flow of how One Big Array 610 manages a distributed infrastructure implemented in One Big Array 610. As shown in FIG. 6, Service Coordinator 620 receives query request 640 to find a service to support management of a heterogeneous data storage resource (Step 710). Service Coordinator 620 analyzes query request 640 to determine if requested resources are available (Step 715). In some embodiments, Service Coordinator 620 may compare query request 640 to database 630 containing registered components or systems. When Service Coordinator 620 makes a determination as to the availability of the requested resource, Service Coordinator 620 returns results (step 720). In some embodiments, a returned result may include a status of the requested component or system. In other embodiments, a returned result may return access to the requested component or system. In certain embodiments, a returned result may return that the requested component or system is unavailable.

Figure 8:
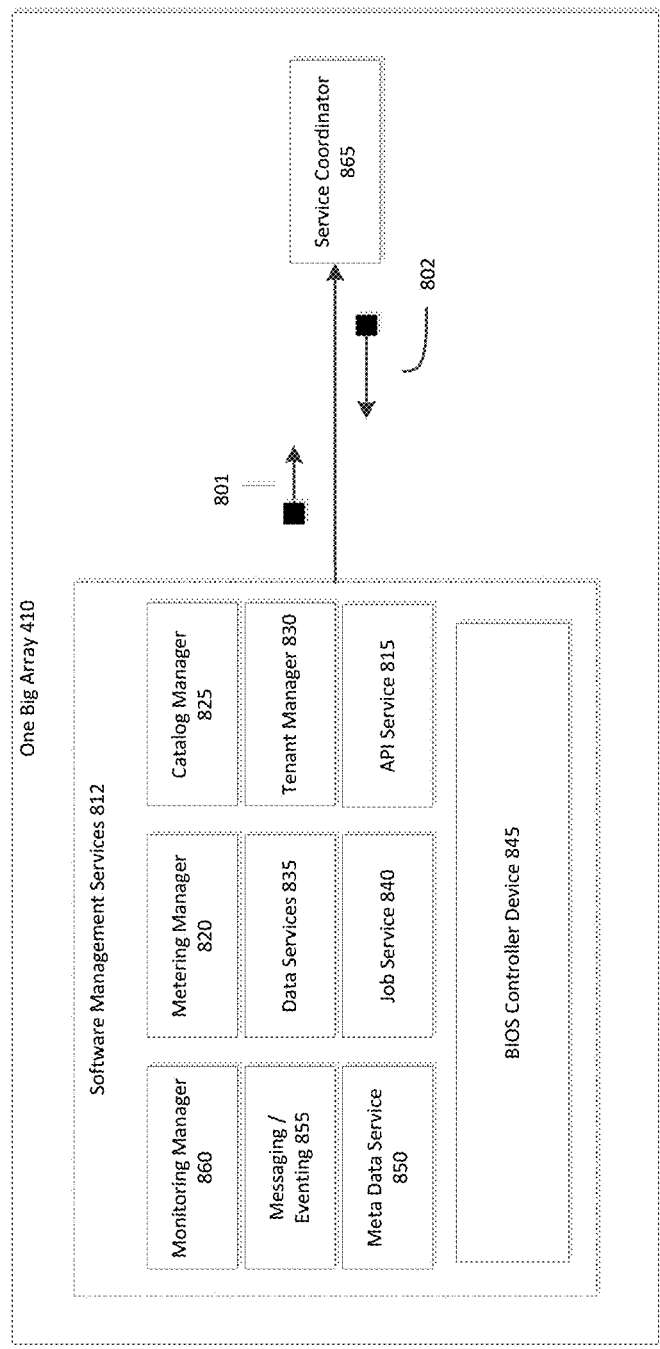
FIG. 8 is a further alternative simplified illustration of a distributed infrastructure of a one big array, in accordance with an embodiment of the present disclosure.
Figure 9:
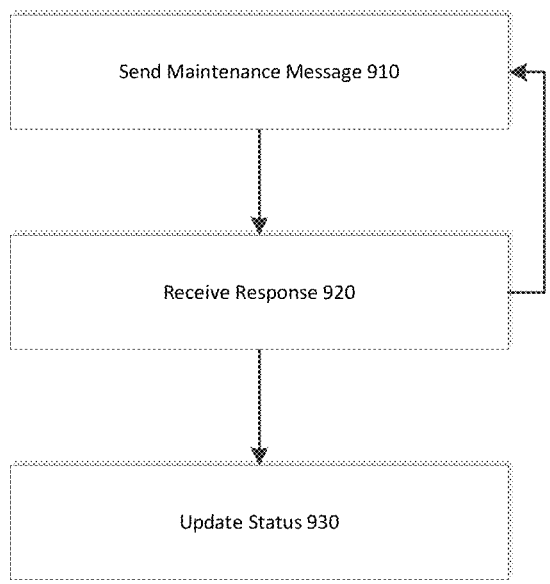
FIG. 9 is a further example embodiment of a method of managing a distributed infrastructure of a one big array, in accordance with an embodiment of the present disclosure.

Refer now to the example embodiments of FIGS. 8 and 9. The example embodiments illustrate a simplified flow of how One Big Array 810 manages a distributed infrastructure implemented in One Big Array 810. As shown in FIG. 8, Service Coordinator 865 communicates with software management services 812 of the One Big Array 810. Service Coordinator 865 sends maintenance message 802 (Step 910) to one or more of the components or systems in the One Big Array 810. Service Coordinator 865 continues to send maintenance message 802 (Step 910) until Service Coordinator 865 receives response message 801 (Step 920) or a timeout is reached. Once response message 801 is received (Step 920), Service Coordinator 865 updates status (Step 930) of the component or system within One Big Array 810. In many embodiments, maintenance message 802 (Step 910) may be a heartbeat message to verify the liveness of a component or system. In other embodiments, maintenance message 802 (Step 910) may have information pertaining to system upgrades. In some embodiments, Service Coordinator 865 may enable rolling software upgrades and/or rolling scheme changes to other components and systems within One Big Array 810.

Figure 10:
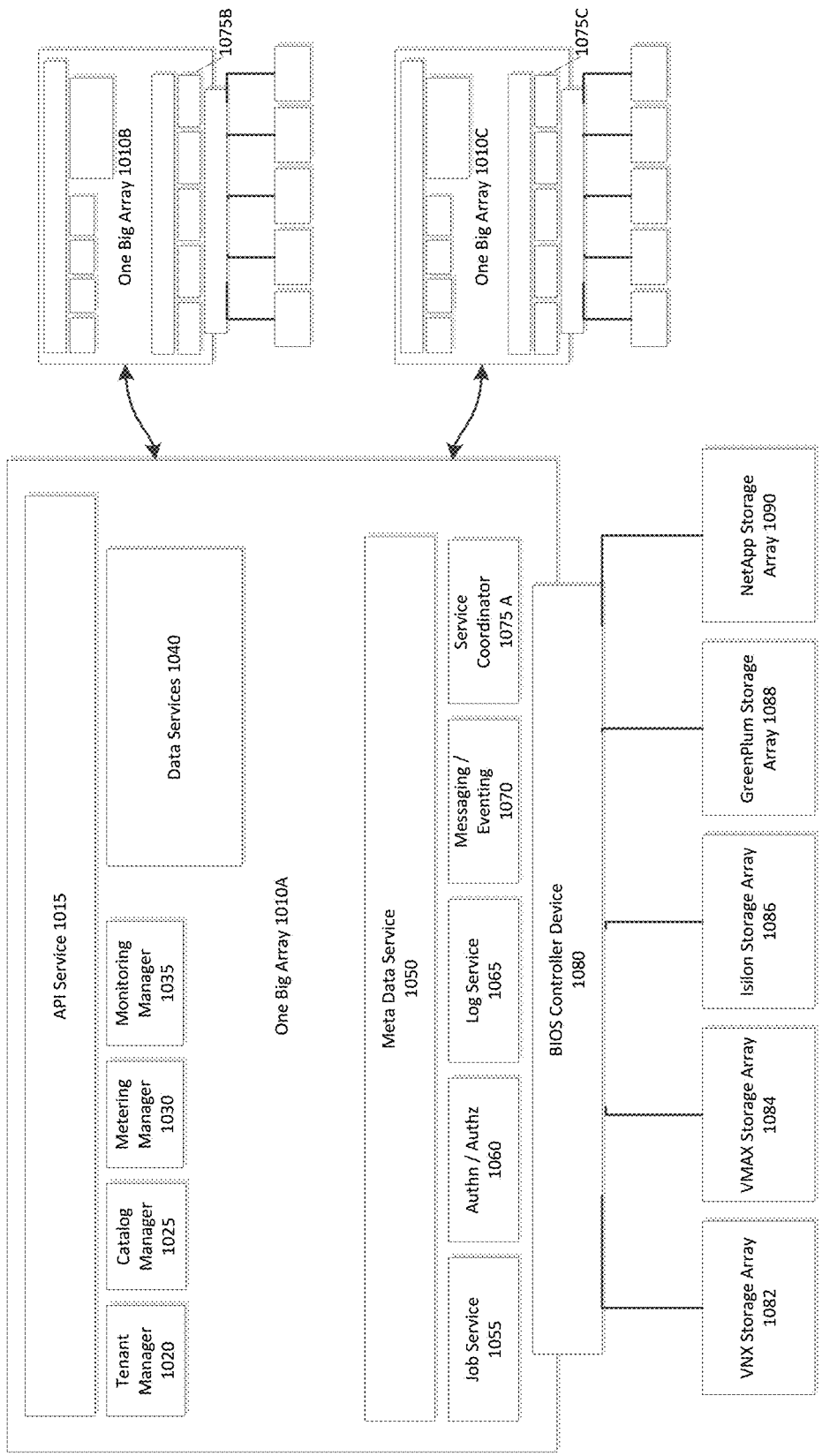
FIG. 10 illustrates a simplified example of a cluster of one big arrays, in accordance with an embodiment of the present disclosure.

Refer now to the example embodiment of FIG. 10. FIG. 10 illustrates a simplified example of a cluster of one big arrays, in accordance with an embodiment of the present disclosure. As shown in FIG. 10, one big array 1010A is one node in a three node cluster. One big array 1010A is federated and networked such that one big array 1010A may communicate with one big arrays 1010B, 1010C and vice versa. As shown, service coordinators 1075A, 1075B, 1075C are synchronized and span to each one big array 1010A, 1010B, 1010C nodes within the cluster. In some embodiments, services within one big array 1010A, 1010B, 1010C may be enabled to communicate with any service coordinator 1075A, 1075B, 1075C and retrieve similar information. For example, a query to service coordinator 1075A would return equivalent results as a query to service coordinator 1075B or service coordinator 1075C.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
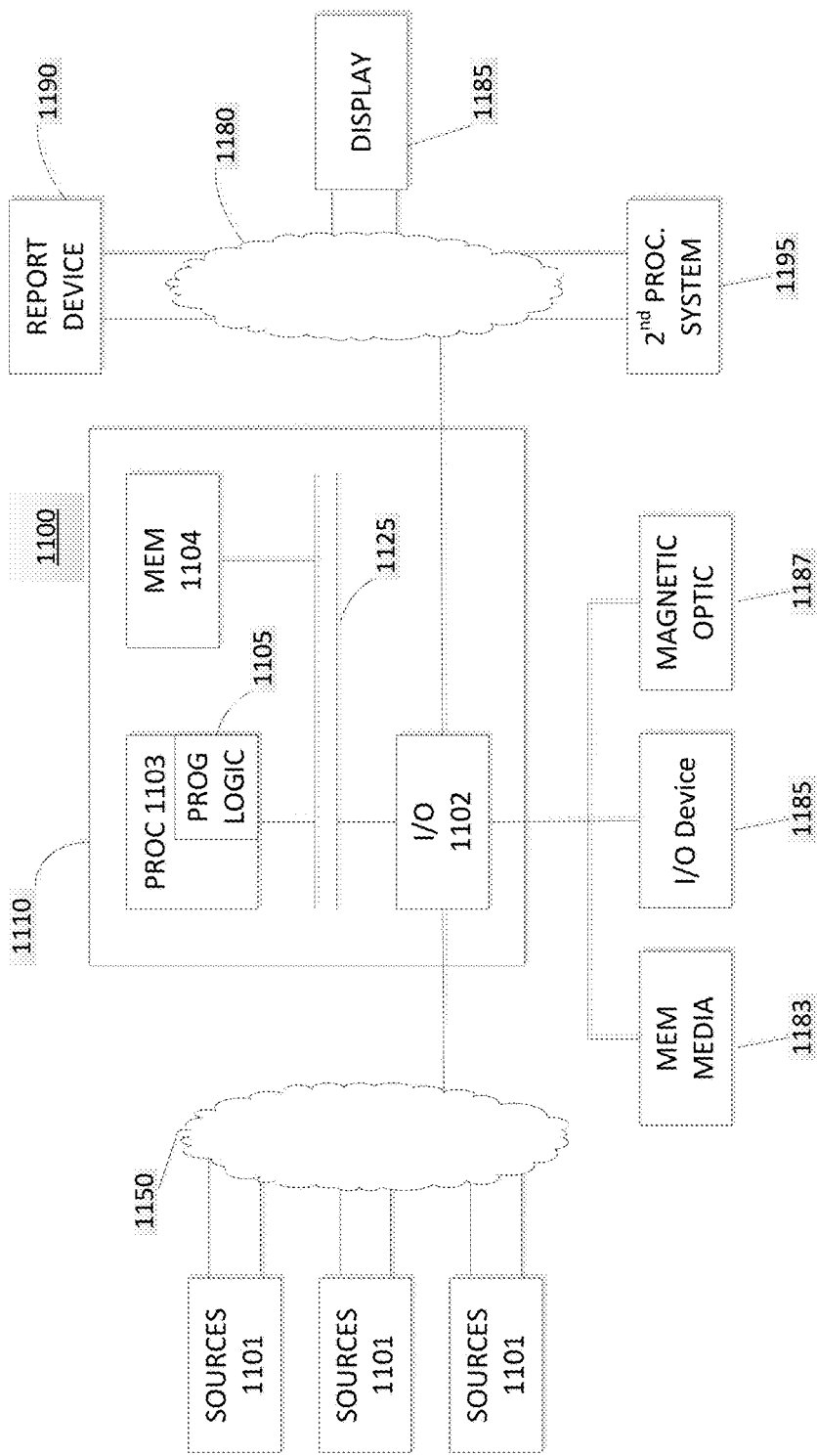
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. When the program code is loaded into memory 1104 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
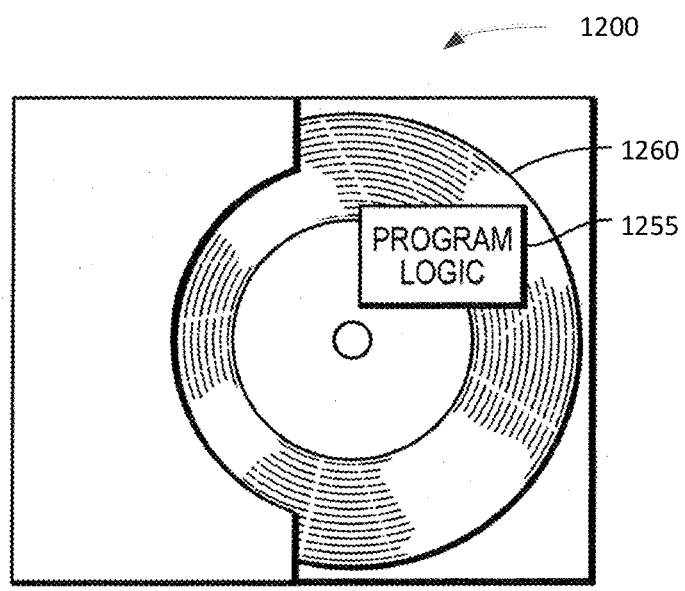
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing software services through a control path, the computer-executable method comprising:
providing an access point, via a service coordinator, to the software services, wherein the software services are provided from a data storage system enabled to manage heterogeneous data storage resources through a single control path, wherein the data storage system is enabled to provide object, block, and file storage through the heterogeneous data storage resources;
providing a service registry and a cluster configuration registry for one or more portions of the data storage system;

coordinating, via the service coordinator, the software services, wherein the service coordinator is enabled to use distributed locks to serialize access to a data storage resource from the heterogeneous data storage resources;

communicating with a second data storage system, via the service coordinator, wherein the service coordinator is enabled to provide access to software services from the data storage system and the second data storage system through the control path; and enabling, via the service coordinator, provisioning of data services on a data storage resource selected from heterogeneous data storage resources including one or more data storage resources;

wherein the service coordinator is enabled to provide a catalog of active services.

2. The computer-executable method of claim 1, wherein coordinating comprises:

registering a first software service of the software services with the service coordinator; wherein the first software service enables access to at least one of the data services; wherein the at least one data service provides access to at least one of the one or more data storage resources from the heterogeneous data storage resources.

3. The computer-executable method of claim 2, wherein registering the first software service of the software services comprises:

sending a message from the first software service to the service coordinator; wherein the message includes an attribute; and storing the attribute using the service coordinator.

4. The computer-executable method of claim 3, wherein said attribute is selected from the group consisting of a name, a version, and a unique ID.

5. The computer-executable method of claim 1, wherein coordinating the software services, comprises:

receiving a query request from a first software service of the software services;

analyzing the query request to determine a type of software service requested; and based on the determination, using the service coordinator to respond to the query request.

6. The computer-executable method of claim 5, wherein using the service coordinator to respond to the query request comprises providing access to the type of software service requested.

7. The computer-executable method of claim 1, wherein coordinating the software services comprises:

monitoring the software services using the service coordinator.

8. The computer-executable method of claim 7, wherein the monitoring of the software services using the service coordinator comprises:

sending a heartbeat message to a first software service of the software services to determine a status of the first software service.

9. The computer-executable method of claim 1, wherein the coordinating comprises:

communicating messages relating to the data services between the service coordinator and a first software service of the software services.

10. A system, comprising:

one or more data storage arrays having a data storage resource from heterogeneous storage resources, available for provisioning managed by software services through a control path; and computer-executable logic encoded in memory of one or more computers in communication with the available data storage resource, wherein the computer executable program logic is configured for the execution of:

providing an access point, via a service coordinator, to the software services, wherein the software services are provided from a data storage system enabled to manage heterogeneous data storage resources through a single control path, wherein the data storage system is enabled to provide object, block, and file storage through the heterogeneous data storage resources;

providing a service registry and a cluster configuration registry for one or more portions of the data storage system;

coordinating, via the service coordinator, the software services, wherein the service coordinator is enabled to use distributed locks to serialize access to a data storage resource from the heterogeneous data storage resources;

communicating with a second data storage system, via the service coordinator, wherein the service coordinator is enabled to provide access to software services from the data storage system and the second data storage system through the control path; and enabling, via the service coordinator, provisioning of data services on a data storage resource selected from heterogeneous data storage resources including one or more data storage resources;

wherein the service coordinator is enabled to provide a catalog of active services.

11. The system of claim 10, wherein coordinating comprises:

registering a first software service of the software services with the service coordinator; wherein the first software service enables access to at least one of the data services; wherein the at least one data service provides access to at least one of the one or more data storage resources from the heterogeneous data storage resources.

12. The system of claim 11, wherein registering the first software service of the software services comprises:

sending a message from the first software service to the service coordinator; wherein the message includes an attribute; and storing the attribute using the service coordinator.

13. The system of claim 12, wherein said attribute is selected from the group consisting of a name, a version, and a unique ID.

14. The system of claim 10, wherein coordinating the software services comprises:

receiving a query request from a first software service of the software services;

analyzing the query request to determine a type of software service requested; and based on the determination, using the service coordinator to respond to the query request.

15. The system of claim 14, wherein using the service coordinator to respond to the query request comprises providing access to the type of software service requested.

16. The system of claim 10, wherein coordinating the software services comprises:

monitoring the software services using the service coordinator.

17. The system of claim 16, wherein the monitoring of the software services using the service coordinator comprises:

sending a heartbeat message to a first software service of the software services to determine a status of the first software service.

18. The system of claim 10, wherein the coordinating comprises:
communicating messages relating to the data services between the service coordinator and a first software service of the software services.

19. A computer program product for managing software services through a control path, the computer program product comprising:
a non-transitory computer readable medium encoded with computer-executable program code for using read signatures, in replication, the code configured to enable the execution of:
providing an access point, via a service coordinator, to the software services, wherein the software services are provided from a data storage system enabled to manage heterogeneous data storage resources through a single control path, wherein the data storage system is enabled to provide object, block, and file storage through the heterogeneous data storage resources;
providing a service registry and a cluster configuration registry for one or more portions of the data storage system;
coordinating, via the service coordinator, the software services, wherein the service coordinator is enabled to use distributed locks to serialize access to a data storage resource from the heterogeneous data storage resources;
communicating with a second data storage system, via the service coordinator, wherein the service coordinator is enabled to provide access to software services from the data storage system and the second data storage system through the control path; and
enabling, via the service coordinator, provisioning of data services on a data storage resource selected from heterogeneous data storage resources including one or more data storage resources;
wherein the service coordinator is enabled to provide a catalog of active services.

20. The computer program product of claim 19, wherein coordinating comprises:
registering a first software service of the software services with the service coordinator; wherein the first software service enables access to at least one of the data services; wherein the at least one data service provides access to at least one of the one or more data storage resources from the heterogeneous data storage resources.

21. The computer program product of claim 20, wherein registering the first software service of the software services comprises:
sending a message from the first software service to the service coordinator wherein the message includes an attribute; and
storing the attribute using the service coordinator.

22. The computer program product of claim 21, wherein said attribute is selected from the group consisting of a name, a version, and a unique ID.

23. The computer program product of claim 19, wherein coordinating the software services comprises:
receiving a query request from a first software service of the software services;
analyzing the query request to determine a type of software service requested; and
based on the determination, using the service coordinator to respond to the query request.

24. The computer program product of claim 23, wherein using the service coordinator to respond to the query request comprises providing access to the type of software service requested.

25. The computer program product of claim 19, wherein coordinating the software services comprises:
monitoring the software services using the service coordinator.

26. The computer program product of claim 25, wherein the monitoring of the software services using the service coordinator comprises:
sending a heartbeat message to a first software service of the software services to determine a status of the first software service.

27. The computer program product of claim 19, wherein the coordinating comprises:
communicating messages relating to the data services between the service coordinator and a first software service of the software services.

* * * * *